(12) United States Patent
Tichelaar (10) Patent No.: US 8,350,963 B2
(45) Date of Patent: Jan. 8, 2013

(54) VIDEO PROCESSING DEVICE AND METHOD OF PROCESSING VIDEO DATA

(75) Inventor: Johannes Y. Tichelaar, Eindhoven (NL)

(73) Assignee: Entropic Communications, Inc., San Diego, CA (US)

( * ) Notice: Subject to any disclaimer, the term of this patent is extended or adjusted under 35 U.S.C. 154(b) by 978 days.

(21) Appl. No.: 12/162,825

(22) PCT Filed: Jan. 31, 2007

(86) PCT No.: PCT/IB2007/050329
§ 371 (c)(1),
(2), (4) Date: Jul. 31, 2008

(87) PCT Pub. No.: WO2007/088515
PCT Pub. Date: Aug. 9, 2007

(65) Prior Publication Data
US 2009/0010616 A1 Jan. 8, 2009

(30) Foreign Application Priority Data
Feb. 3, 2006 (EP) .................................. 06101275

(51) Int. Cl.
*H04N 7/01* (2006.01)
(52) U.S. Cl. .......................... 348/458; 348/448; 348/581
(58) Field of Classification Search .................. 348/448, 348/581, 452, 458
See application file for complete search history.

(56) References Cited

U.S. PATENT DOCUMENTS

| 6,611,260 B1 * | 8/2003 | Greenberg et al. | 345/204 |
| 6,724,948 B1 | 4/2004 | Lippincott | |

(Continued)

FOREIGN PATENT DOCUMENTS

| JP | 2003-011891 | 1/1991 |
| JP | 2005-284469 | 10/2005 |
| WO | 2005112447 A | 11/2005 |

OTHER PUBLICATIONS

De Haan G.; Bellers, E.B., "Deinterlacing—An Overview," Proceedings of the IEEE, vol. 86, No. 9, p. 1839-1857, Sep. 1998. IEEE, Piscataway, NJ, USA.

(Continued)

*Primary Examiner* — Farzana Hossain
(74) *Attorney, Agent, or Firm* — Duane Morris LLP (57) ABSTRACT

A video-processing device is provided for processing a main video data flow and a secondary video data flow. The secondary video data flow constitutes a scaled version of the main video data flow. The video-processing device comprises a tap-off unit (T, T2) having an input for receiving the main video data flow. The tap-off unit (T, T2) comprises at least a first and second output, wherein each of the outputs corresponds to the input of the tap-off unit. A first H- and V-scaling unit (HVS1) is coupled to the first output of the tap-off unit (T, T2) for performing a first H- and V-scaling on the main video flow. A second H- and V-scaling unit (HVS2) is coupled to the second output of the tap-off unit for performing a second H- and V-scaling on the secondary video flow to provide a scaled secondary video flow. By tapping-off the main video flow there is no need for the device to access a memory to extract the video data from the main video flow to provide a secondary video flow.

6 Claims, 11 Drawing Sheets

U.S. PATENT DOCUMENTS

| | | | |
|---|---|---|---|
| 6,788,347 | B1 | 9/2004 | Kim et al. |
| 7,255,676 | B2 * | 8/2007 | Higuchi et al. ............... 600/118 |
| 2003/0174136 | A1 | 9/2003 | Emberling et al. |
| 2004/0091248 | A1 | 5/2004 | Tada et al. |
| 2007/0139425 | A1 * | 6/2007 | Neuman ........................ 345/520 |

OTHER PUBLICATIONS

ATI: "The Avivo Display Engine" [Online] 2005, XP002437565, Retrieved From the Internet: URL: http://ati.amd.com/technology/avivo/pdf/Avivo_Display_Engine_Whitepaper_v2_final.pdf> Retrieved on Jun. 13, 2007. pp. 4-8.

Alexey Stepin, Yaroslav Lyssenko, Anton Shilov: "ATI Radeon X1000: Brand-New Graphics Architecture From ATI Explored", X-BIT Labs, [Online], Oct. 5, 2005, XP002437566, Retrieved on Jun. 13, 2007. http://www.xbitlabs.com/articles/video/print/radeon-x1000.html.

Chen H-F et al; "P-44: Smooth Frame Insertion Method for Motion-Blue Reduction in LCDS", 2005.

Eric Bangeman, "AMD to buy ATI", URL:http//arstechnica.com/old/content/2006/07/07328.ars.

Manfred Bertuch et al., "High-End-Grafik-aber gunstig!", c't, Dec. 27, 2005, vol. 2006, No. 1, pp. 98-103.

Manfred Bertuch, "Breit aufgestellt", c't, Oct. 17, 2005, vol. 2005, No. 22, pp. 24-26.

Nico Jurran, "Neue Grafiken fur neues Fernsehen", c't, Oct. 4, 2005, vol. 2005, No. 21, p. 26.

Laurrenz Weiner, "Schatzsuche", c't, Oct. 17, 2005, vol. 2005, No. 2005, pp. 126-135.

* cited by examiner

VIDEO PROCESSING DEVICE AND METHOD OF PROCESSING VIDEO DATA

FIELD OF THE INVENTION

The present invention relates to a video processing device and a method for processing video data.

Within high definition TV (HDTV) systems and playing and recording devices, a secondary output can be provided which does not correspond in resolution to the HDTV signal but relates to a enhanced definition TV (EDTV) or standard definition TV (SDTV) signal which corresponds to a downscaled HDTV signal. Such a EDTV or SDTV secondary output may be used for recording or displaying.

BACKGROUND OF THE INVENTION

US 2004/0091248 A1 discloses an apparatus for recording a video signal into a recording medium. The apparatus comprises a decoder for decoding a stream signal to the output of the video signal and a scaler unit for changing the display scale of the video signal from the decoder in response to a desired size of a thumbnail picture.

Figure 16:
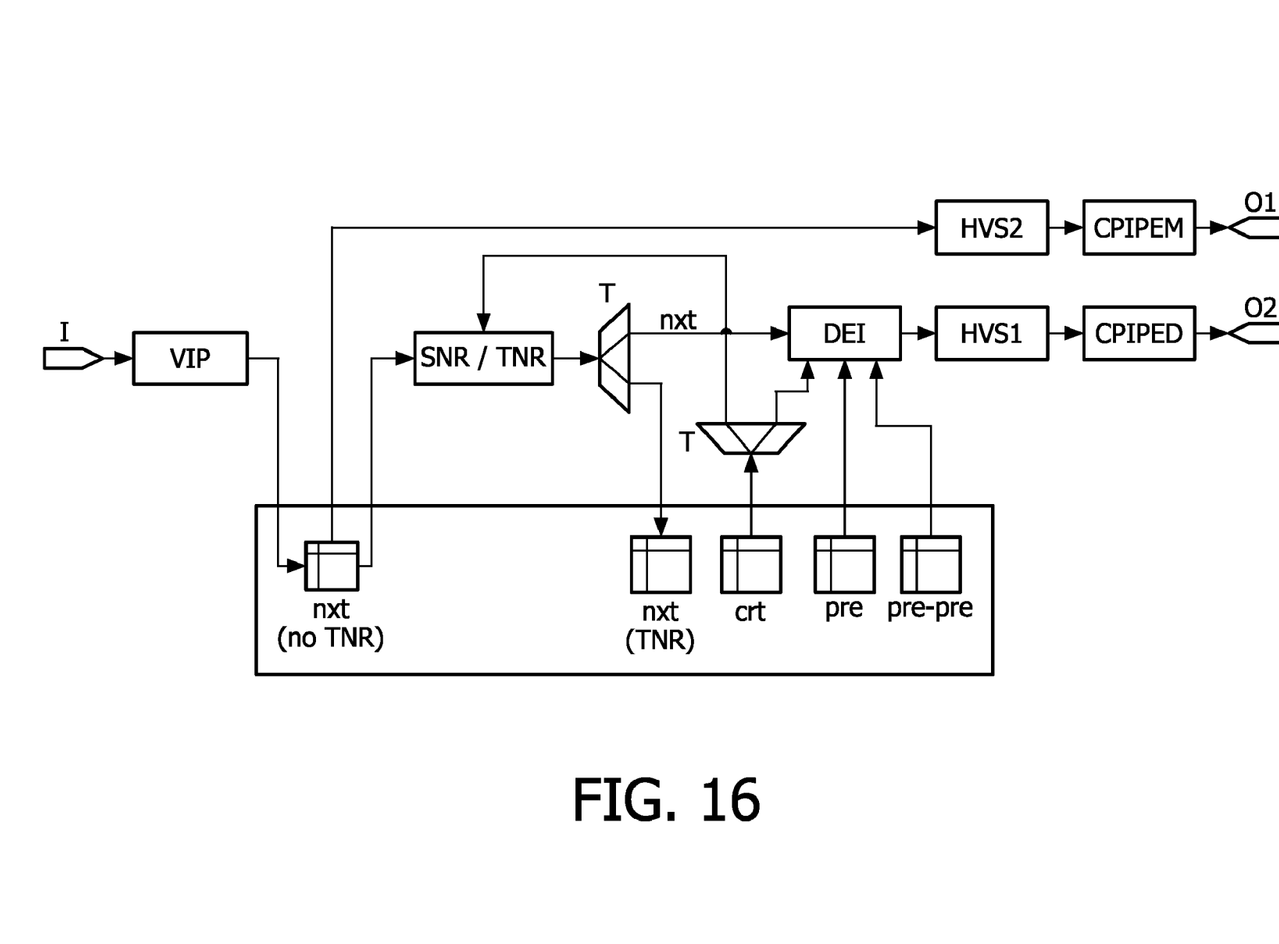
FIG. 16 shows a block diagram of HDTV video processing device according to the prior art.

FIG. 16 shows a block diagram of a video processing device according to the HDTV standard according to the prior art. The input video signal is captured by a video capturing unit VIP and is buffered in the memory MEM (preferably a unified memory). The video processing device comprises a spatial noise reduction unit SNR, a temporal noise reduction unit TNR, a de-interlacing unit DEI, a first H- & V-scaling unit HVS1. The main video flow will read the video signal as stored in the memory MEM and will perform a spatial and/or temporal noise reduction in the spatial noise reduction unit SNR and the temporal noise reduction unit TNR. Thereafter, a de-interlacing, preferably up to four fields, (i.e. four buffers nxt, crt, pre, pre-pre are used for the next, the current, the previous and the pre-previous frame, respectively), will be performed by the de-interlacing unit DEI and a first H & V scaling (horizontal and vertical) is performed by the HV scaler HVS1. In order to provide a secondary output, a secondary flow of a video data is required. Video data buffered in the buffer nxt in the memory MEM is extracted or read and a H- & V-scaling is performed by a second H- and V-scaler HVS2 and a re-interlacing is performed if required. Thereafter, the video flow continues to the composition pipe CPIPEM for the monitor out.

However, within such a video data processing device the required memory bandwidth of such a secondary downscaled video output will still be significant.

SUMMARY OF THE INVENTION

It is therefore an object of the invention to provide a video processing device with a secondary (down)scaled video output which requires a reduced memory bandwidth for its processing.

Therefore, a video processing device is provided for processing a main video data flow and a secondary video data flow. The secondary video data flow constitutes a scaled version of the main video data flow. The video processing device comprises a tap-off unit having an input for receiving the main video data flow. The tap-off unit comprises at least a first and second output, wherein each of the outputs corresponds to the input of the tap-off unit. A first H- and V-scaling unit is coupled to the first output of the tap-off unit for performing a first H- and V-scaling on the main video flow. A second H- and V-scaling unit is coupled to the second output of the tap-off unit for performing a second H- and V-scaling on the secondary video flow to provide a scaled secondary video flow. By tapping-off the main video flow there is no need for the device to access a memory to extract the video data from the main video flow to provide a secondary video flow.

According to an aspect of the invention, the video processing device furthermore comprises a memory. The output of the second H- and V-scaling unit is buffered in this memory before it is output to the output of the secondary video flow. By buffering the output of the second H- and V-scaling unit, the output of the secondary video flow can be decoupled from the processing of the second H- and V-scaling unit.

According to a further aspect of the invention, the video processing device may comprise a spatial noise reduction unit, a temporal noise reduction and/or a de-interlacing unit.

According to a preferred aspect of the invention, the tap-off unit is coupled to the output of the de-interlacing unit.

The invention also relates to a method for processing video data by processing a main video flow and a secondary video flow. The secondary video flow constitutes a scaled version of the main flow. The main video flow is tapped off to provide a first and second tapped-off output. A first H- and V-scaling is performed on the first tapped-off output to provide a H- and V-scaling of the main video flow. A second H- and V-scaling is performed on the second tapped-off output to provide a H- and V-scaling of the secondary video flow.

The invention relates to the idea to provide a secondary (down)scaled video output within a HDTV capable video processing device. According to the prior art the secondary downscaled is realized by providing a secondary video flow with a second H- and V-scaling of video data stored in a unified memory, i.e. before a temporal noise reduction is performed thereon. In other words, a main video flow as well as the secondary video flow need to access the video data from memory, where input video is stored by the video capturing unit. However, according to the invention the secondary video flow for the secondary (down)scaled video output is achieved by providing a secondary scaler preferably after the de-interlacer of the main video flow. The secondary downscaling is provided by tapping-off from the main video flow. Preferably, the secondary downscaled video flow is buffered in the memory in order to decouple the secondary output. Therefore, a very high picture quality SDTV output which may constitute a downscaled replica of the HDTV output is provided within a HDTV compatible video processing system.

Other aspects of the invention are subject to the dependent claims.

BRIEF DESCRIPTION OF THE DRAWINGS

The embodiments of the invention as well as their advantages are now described in more detail with reference to the Figures.

DETAILED DESCRIPTION OF EMBODIMENTS

The embodiments of the invention relate to a video processing device or video processing system which is capable of performing HDTV video processing. Preferably, the main components relate to a memory based video processing MBVP having noise reduction units, a de-interlacer and a HV scaler.

Figure 1:
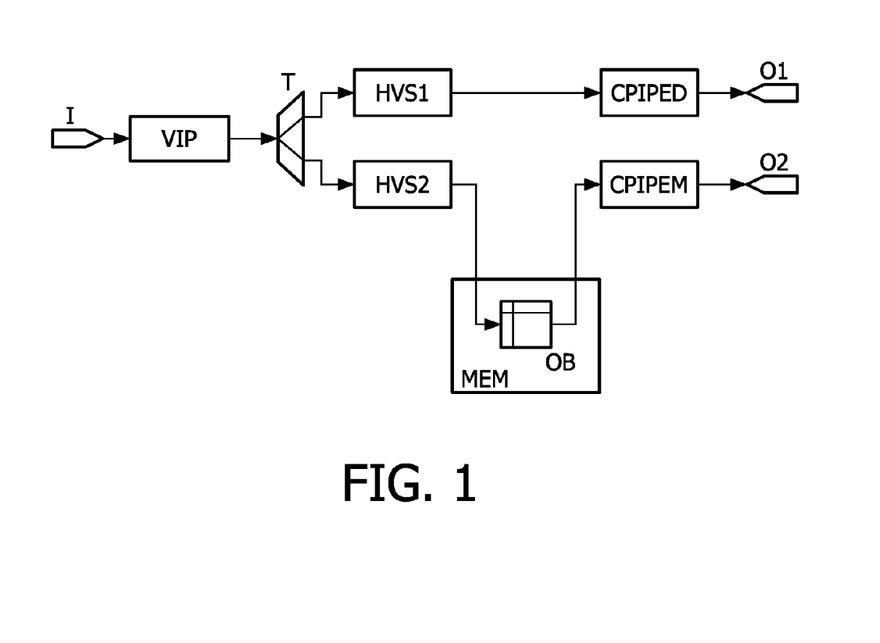
FIG. 1 shows a block diagram of a HDTV video processing device according to a first embodiment.

FIG. 1 shows a block diagram of a HDTV video processing device according to a first embodiment. The input video signal I is captured by a video capturing unit VIP. The video capturing unit VIP is directly coupled to a tap-off unit T to provide two outputs according to the input from the video capturing unit VIP. The tapping-off is defined as follows: an input x gives two outputs y and z, where y equals x or a delayed version of x, z equals x or a delayed version of x, and both outputs do not necessarily have the same delay from input to output. The first output of the tap-off unit T is coupled to a first H- and V-scaling unit HVS1, which in turn is coupled to a composition pipe display output CIPED. The second output of the tap-off unit T is coupled to a second H- and V-scaling unit HVS2. The output of the second HV-scaling unit HVS2 is buffered in an output buffer OB of a memory MEM. The memory may be implemented as a unified memory. A composition pipe memory output CPIPEM is coupled to the output of the output buffer OB.

The main video flow will be implemented or processed by the video capturing unit VIP, the tap-off unit T, the first H- and V-scaling unit HVS1 and the composition pipe display output CPIPED. A secondary video flow will be provided by the video capturing unit VIP, the second output of the tap-off unit T, the second H- and V-scaling unit HVS2, the output buffer OB and the composition pipe monitor output CPIPEM. By tapping off the main video flow, a secondary video flow may be implemented which comprises an independent H- and V-scaling unit HVS2 for scaling down the secondary video flow in order to provide a scaled down output which is a scaled replica of the output of the main video flow. Accordingly, by tapping off the main video flow, there is no need for the secondary video flow to access the unified memory MEM. By providing a frame buffering, namely by means of the output buffer OB in the unified memory MEM, the monitor output O2 can be decoupled from the output of the second H- and V-scaling unit HVS2.

Figure 2:
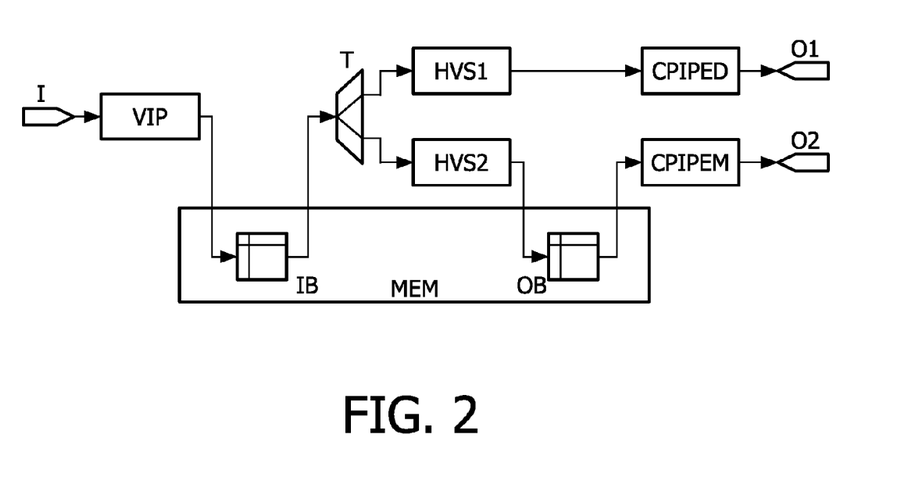
FIG. 2 shows a block diagram of a HDTV video processing device according to a second embodiment.

FIG. 2 shows a block diagram of a HDTV video processing device according to a second embodiment. The architecture of the video processing device according to the second embodiment substantially corresponds to the architecture of the video processing device according to the first embodiment. However, the output of the video capturing unit VIP is buffered in an input buffer IB in the memory MEM. Accordingly, the tap-off unit T has to access the input buffer IB in the unified memory MEM. The provision of the input buffer IB is advantageous, as the input video signal can be decoupled from the subsequent video processing.

Figure 3:
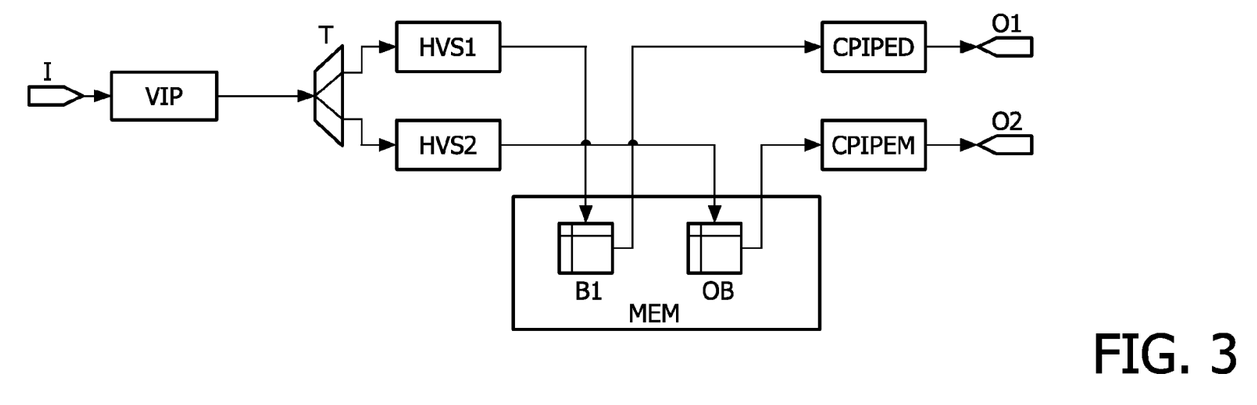
FIG. 3 shows a block diagram of a HDTV video processing device according to a third embodiment.

FIG. 3 shows a block diagram of a HDTV video processing device according to the third embodiment. The architecture of the video processing device according to the third embodiment substantially corresponds to the architecture of the video processing device according to the first embodiment. The only difference is that the output of the first H- and V-scaling unit HVS1 is also frame-buffered in a buffer B1 in the unified memory MEM. By buffering the output of the first H- and V-scaling unit HVS1, the display output O1 can be decoupled from the processing of the first H- and V-scaling unit HVS1.

Figure 4:
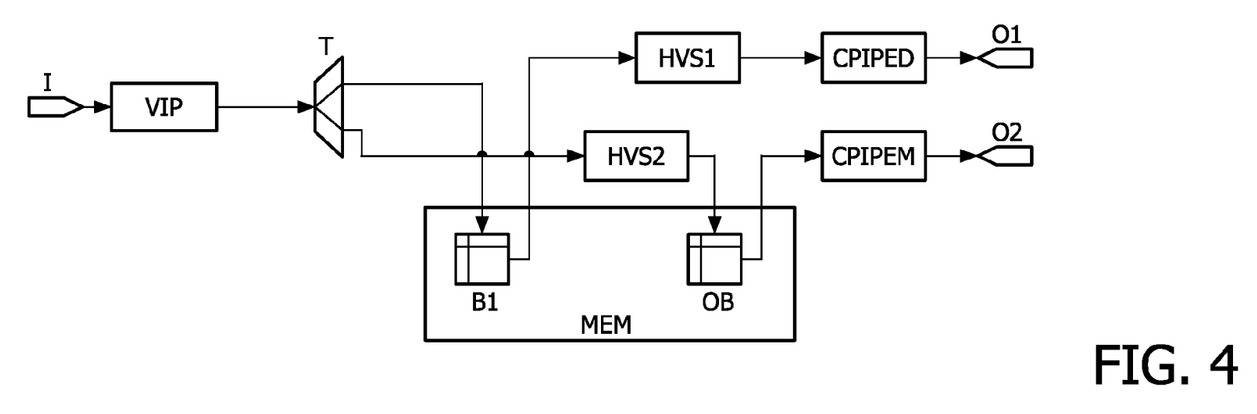
FIG. 4 shows a block diagram of a HDTV video processing device according to a fourth embodiment.

FIG. 4 shows a block diagram of a HDTV video processing device according to the fourth embodiment. The architecture of the HDTV video processing device according to the fourth embodiment substantially corresponds to the architecture of the video processing device according to the first embodiment. Here, the first output of the tap-off unit T1 is frame-buffered in a buffer B1 in the unified memory MEM before being HV-scaled by the first H- and V-scaling unit HVS1. Accordingly, a decoupling between the input video signal and the display output O1 can be realized.

Figure 5:
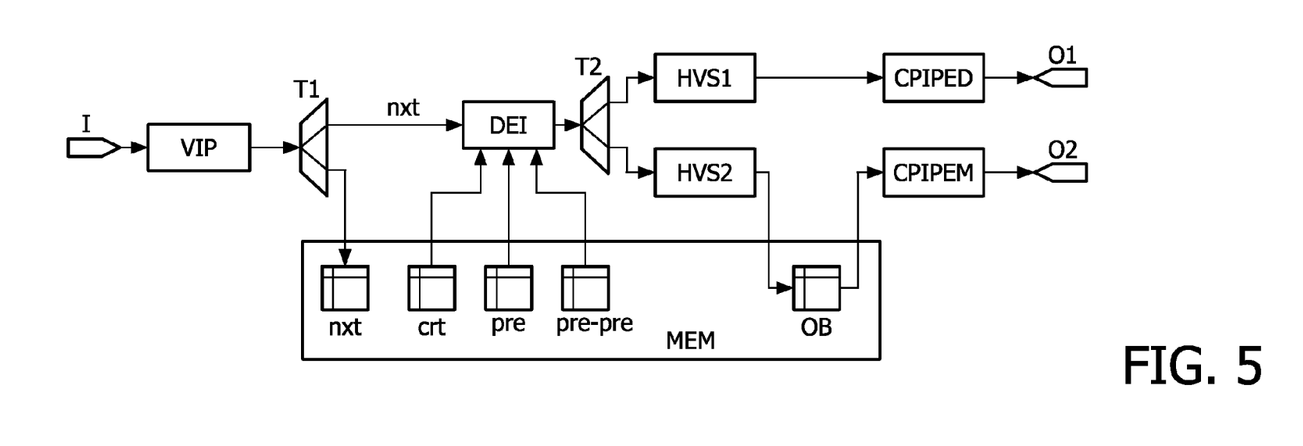
FIG. 5 shows a block diagram of a HDTV video processing device according to a fifth embodiment.

FIG. 5 shows a block diagram of a HDTV video processing device according to the fifth embodiment. An input video signal I is captured by a video capturing unit VIP and is forwarded to a first tap-off unit T1. The first output (nxt) of the tap-off unit T1 is forwarded to a de-interlacing unit DEI. The second output of the tap-off unit T1 is buffered in a buffer nxt within the unified memory MEM. The unified memory furthermore comprises a buffer crt for the current frame, a buffer pre for the previous frame and a buffer pre-pre for the pre-previous frame. The buffers crt, pre and pre-pre are input to the de-interlacing unit DEI together with the next frame nxt. The output of the de-interlacing unit DEI is coupled to a second tap-off unit T2. The first output of the second tap-off unit T2 is coupled to the first H- and V-scaling unit HVS1. The output of the first H- and V-scaling unit HVS1 is again coupled to the composition pipe CPIPED of the display output. The second output of the tap-off unit T2 is coupled to a second H- and V-scaling unit HVS2. The second H- and V-scaling unit HVS2 is decoupled from the composition pipe CPIPEN monitor output by means of an output buffer OB in the unified memory MEM.

The de-interlacing unit DEI uses four buffers nxt, crt, pre, pre-pre in order to perform a temporal 4-field de-interlacing. However, this de-interlacing can be removed if the input video signal I is a progressive video and/or the de-interlacer is a spatial de-interlacer which may be enhanced with an edge directional de-interlacing.

Figure 6:
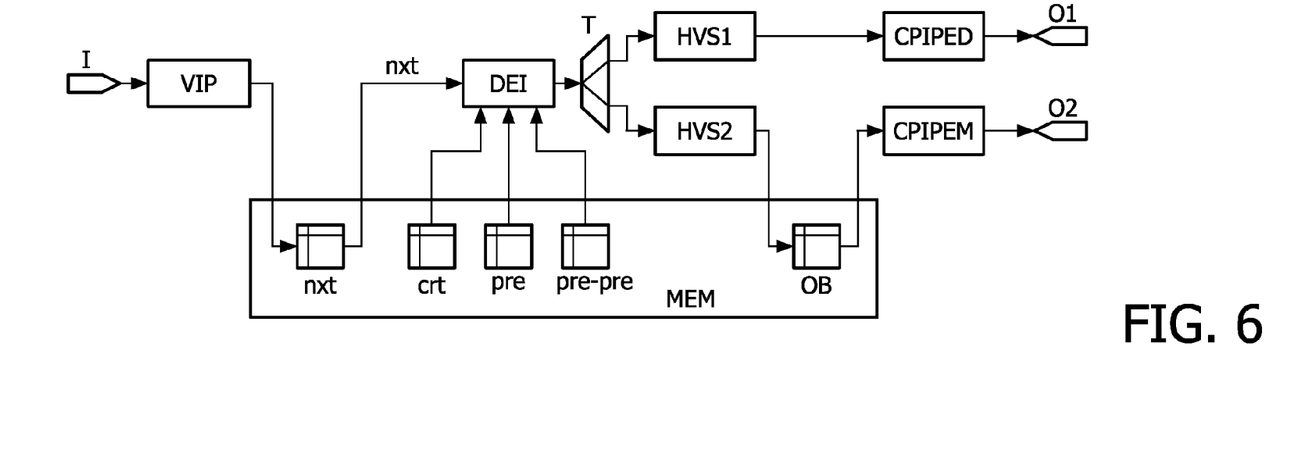
FIG. 6 shows a block diagram of a HDTV video processing device according to a sixth embodiment.

FIG. 6 shows a block diagram of a video processing device according to the sixth embodiment. The architecture of the video processing device according to the sixth embodiment substantially corresponds to the architecture of the video processing device according to the fifth embodiment. The only difference is that the output of the video capturing unit VIP is immediately buffered in the buffer nxt in the unified memory MEM such that the first tap-off unit T1 of FIG. 5 is not required anymore.

Figure 7:
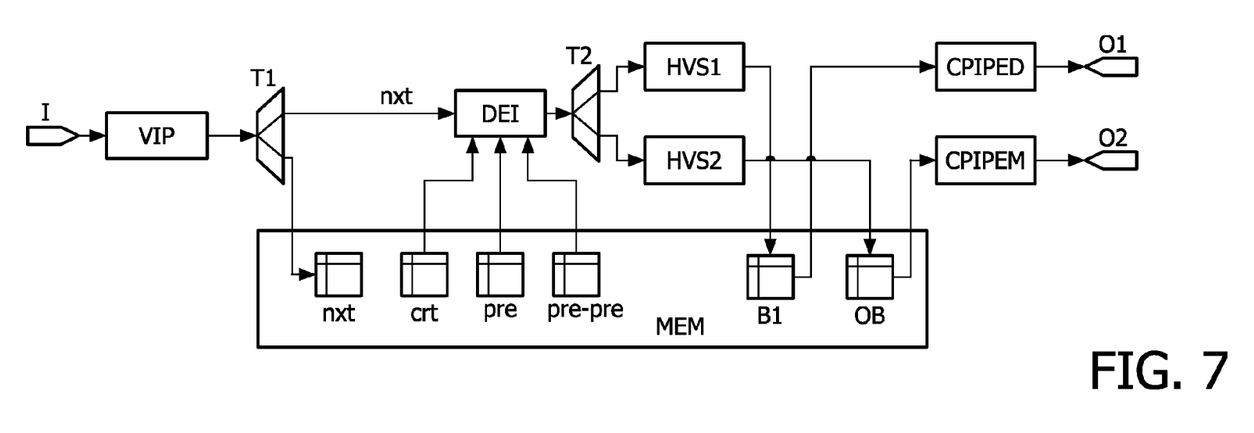
FIG. 7 shows a block diagram of a video processing device according to a seventh embodiment.

FIG. 7 shows a block diagram of a video processing device according to the seventh embodiment. The architecture of the video processing device according to the seventh embodiment substantially corresponds to the architecture of the video processing device according to the fifth embodiment. The only difference is that the output of the first H- and V-scaling unit HVS1 is buffered in a buffer B1 in the memory MEM such that a decoupling of the display output O1 with respect to the input video signal I can be realized.

Figure 8:
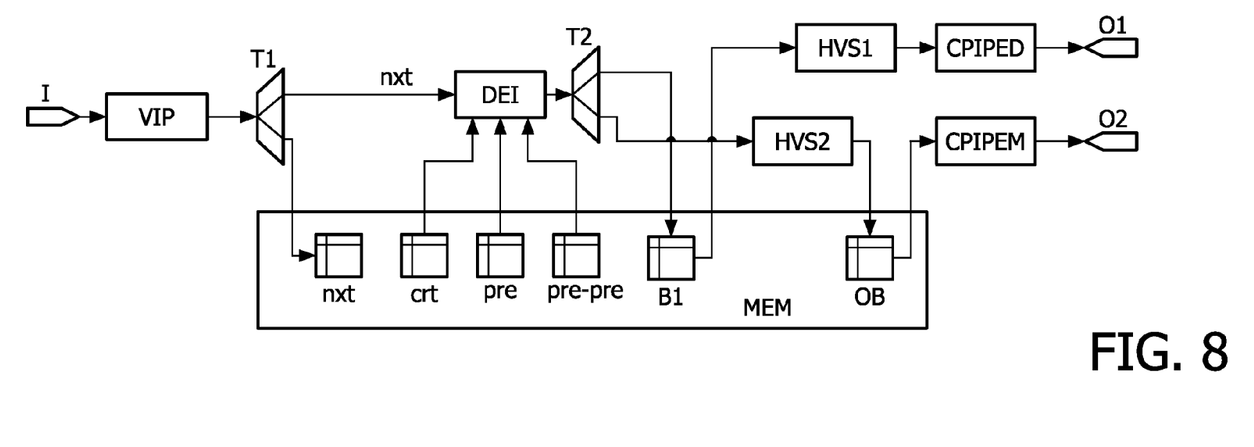
FIG. 8 shows a block diagram of a video processing device according to an eighth embodiment.

FIG. 8 shows a block diagram of a video processing device according to the eighth embodiment. The video processing device according to the eighth embodiment substantially corresponds to the video processing device according to the seventh embodiment, wherein the buffer B1 is coupled between the tap-off unit T2 and the first H- and V-scaling unit HVS1.

Figure 9:
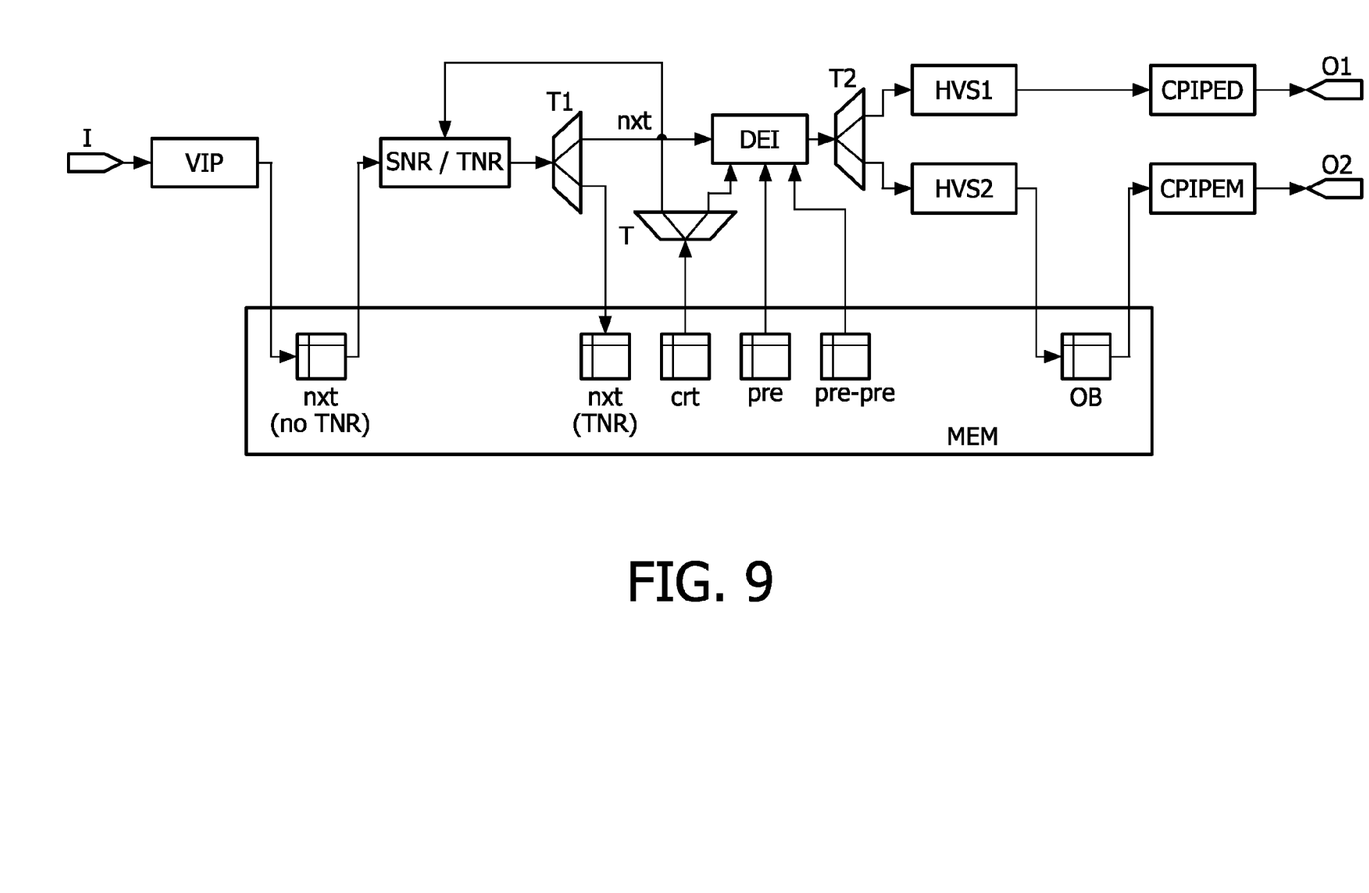
FIG. 9 shows a block diagram of a HDTV video processing device according to a ninth embodiment.

FIG. 9 shows a block diagram of a HDTV video processing device according to a ninth embodiment. Field buffering is preferably performed directly at the input in order to decouple the source and the sink by means of a buffer nxt. The input video signal I is captured by a video capturing unit VIP and is buffered in the memory MEM (preferably a unified memory). The video processing device comprises a spatial noise reduction unit SNR, a temporal noise reduction unit TNR, a de-interlacing unit DEI, and a first H- & V-scaling unit HVS1. The main video flow will read the video signal as stored in the buffer nxt in the memory MEM and will perform a spatial and/or temporal noise reduction in the spatial noise reduction unit SNR and the temporal noise reduction unit TNR. The de-interlacing unit DEI may perform a high quality de-interlacing as described by Gerard de Haan and Erwin B. Bellers, "De-interlacing—An Overview," Proceedings of the IEEE, Vol. 86, No. 9, September 1998, which is incorporated herein by reference.

In order to provide a secondary output, a secondary flow of a video data is tapped-off from the output of the de-interlacing unit DEI by the tap-off unit T2, i.e. tapped-off video signal from the de-interlacer is used as secondary video output. A H- and V-scaling of the output from the de-interlacer is preformed into a SDTV resolution by a second HV-scaler HVS2. The output from the second HV scaler HVS2 can be buffered (buffer BO) in the (unified) memory MEM. Accordingly, the output of the second HV scaler is decoupled from the monitor output by buffering the secondary video flow.

If the output of the second HV scaler HVS2 is field buffered an independent field/frame rate of the monitor output to a recording device and the display can be guaranteed. However, if the main video flow requires a conversion of the frame rate then frame buffering should be provided. One example of a frame rate conversion could be a conversion from 50 Hz to 60 Hz, which may be performed by frame repeat. Such a frame rate conversion may be performed in order to reduce picture flicker. Other examples of frame rate conversions may be conversions from 24 Hz to 72 Hz or 25 Hz to 75 Hz, if 3:2 (60 Hz) or 2:2 (50 Hz) pull-down film modes are received, respectively. Conversions that relate to for instance dynamic frame insertion (DFI) for fast LCD panels may be conversions from 50 Hz to 100 Hz and 60 Hz to 120 Hz.

Figure 10:
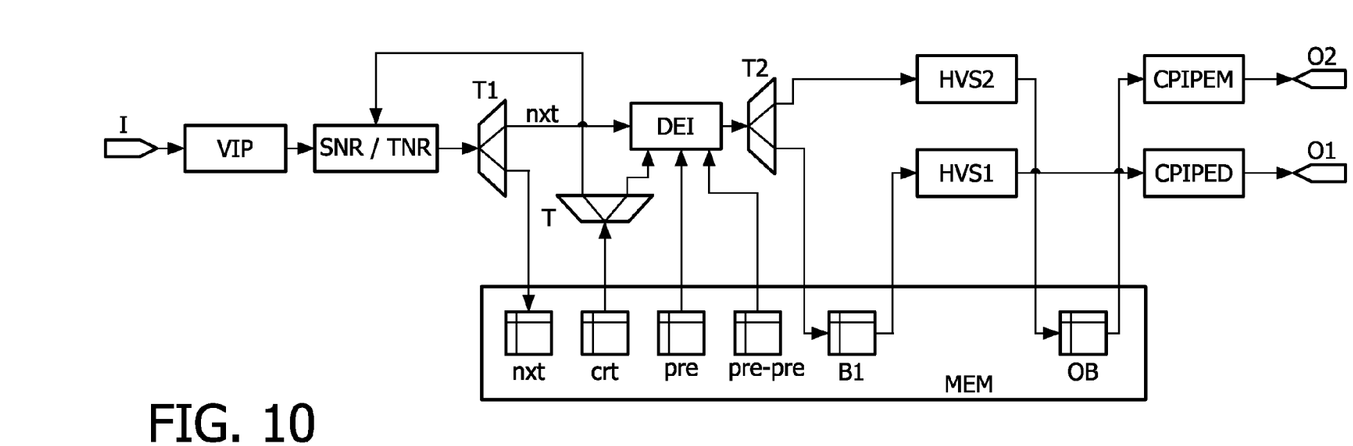
FIG. 10 shows a block diagram of a HDTV video processing device according to a tenth embodiment.

FIG. 10 shows a block diagram of a HDTV video processing device according to a tenth embodiment. The video processing device according to the tenth embodiment differs from the video processing device according to the ninth embodiment in that the frame buffering (buffer B1) to decouple the source and the sink is arranged between the de-interlacer DEI and the first H- and V-scaling unit HVS1. Accordingly, the first HV scaler HVS1 of the main video flow reads the video data from the frame buffer (preferably in the unified memory) while the second HV scaler HVS2 of the secondary video flow uses the output of the de-interlacer as input, i.e. as according to the first embodiment.

The video processing device according to the tenth embodiment is in particular advantageous for frame rate up conversions and if the resolution of the display is greater than the resolution of the input video.

Figure 11:
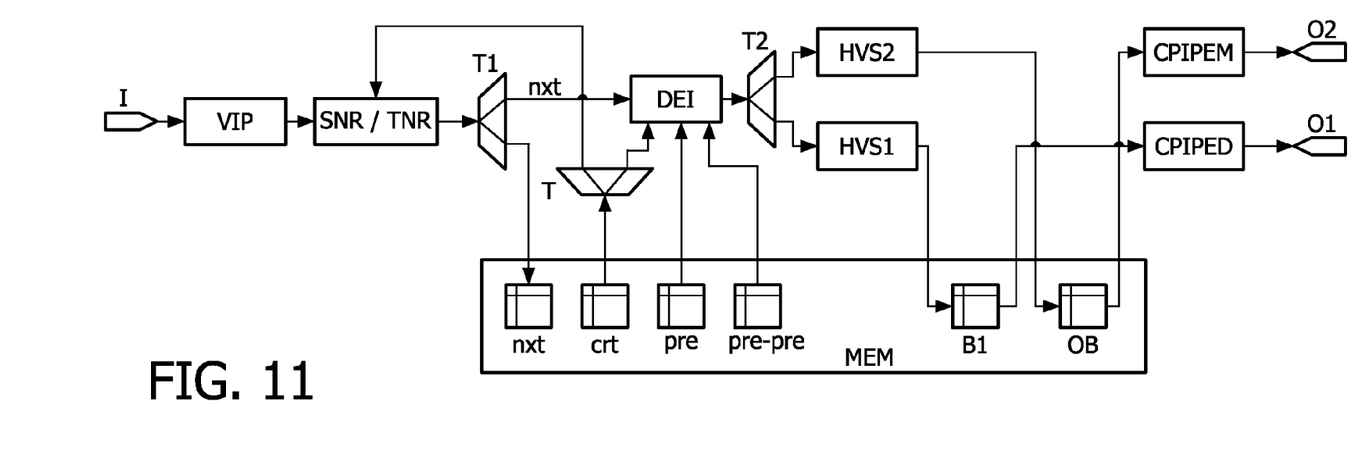
FIG. 11 shows a block diagram of a HDTV video processing device according to the eleventh embodiment.

FIG. 11 shows a block diagram of a HDTV video processing device according to the eleventh embodiment. The video processing device according to the eleventh embodiment substantially corresponds to the video processing device according to the tenth embodiment but is designed for the case that the display has a lower resolution than the input video. Accordingly, in contrast to the second embodiment the frame buffering (buffer B1) for the main video flow is performed after the first HV scaler HVS1. The arrangement of the secondary video flow corresponds to the secondary video flow of the first or second embodiment.

Figure 12:
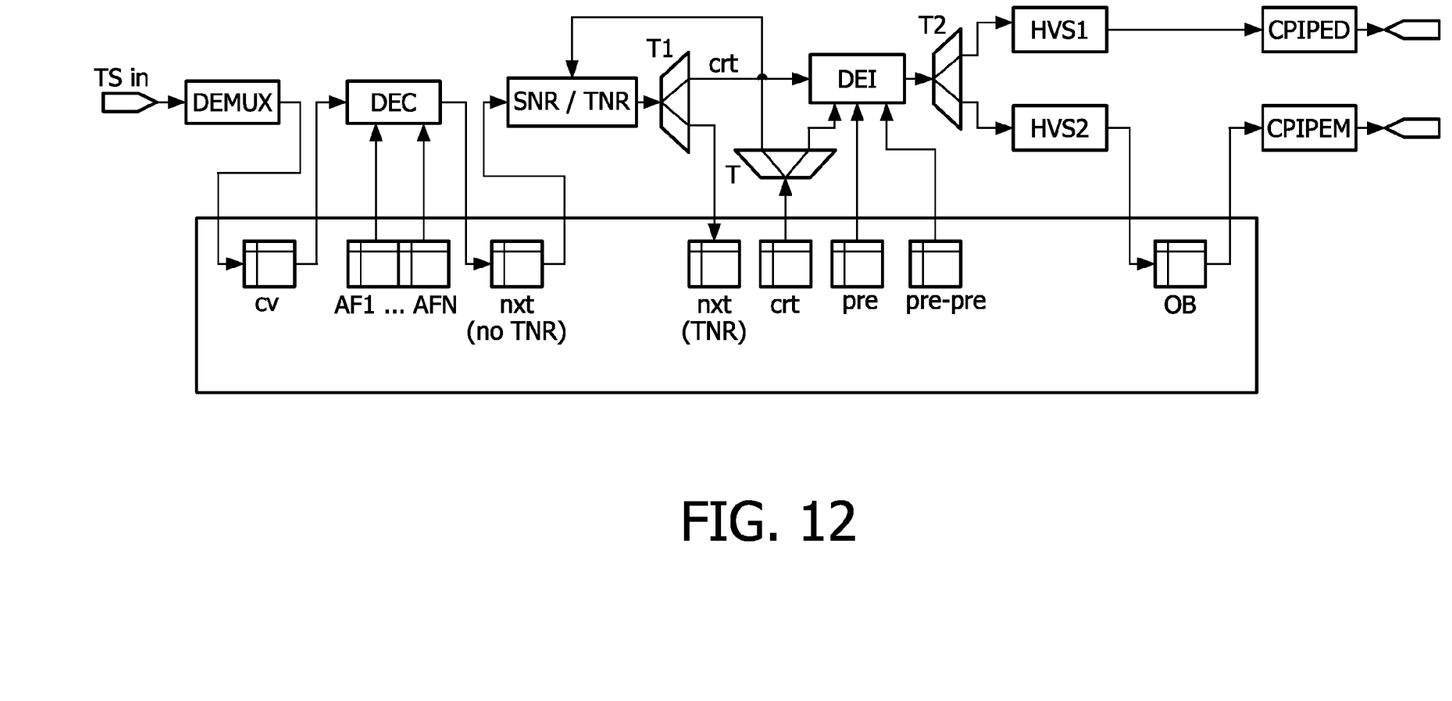
FIG. 12 shows a block diagram of a HDTV video processing device according to the twelfth embodiment.

FIG. 12 shows a block diagram of a HDTV video processing device according to the twelfth embodiment. The video processing device according to the twelfth embodiment uses a demultiplexer DEMUX and a MPEG or H264 decoder DEC instead of a video capturing unit VIP. The other components of the video processing device correspond to the components according to the tenth embodiment.

An advantage of having a spatial noise reduction SNR functionality in the video processing flow in relation to a compressed video input like for instance MPEG or H264, or an uncompressed video input that has been compressed and decompressed at least once, is that this unit is very capable of MPEG artifact reduction. MPEG artifacts are generally perceived as blocking artifacts due to slightly different DC levels per macroblock, mosquito noise due to quantization errors in especially high spatial frequencies in the video, and ringing or halo effects.

Figure 13:
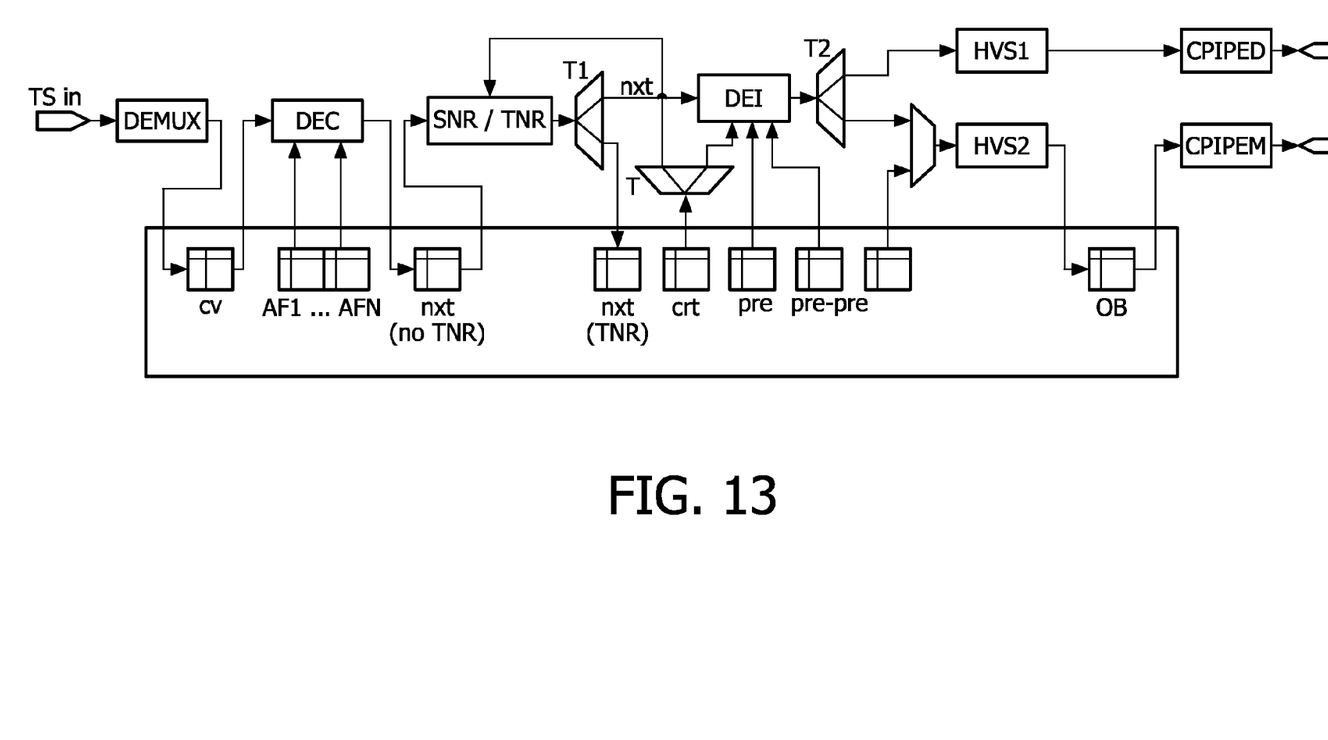
FIG. 13 shows a block diagram of a HDTV video processing device according to the thirteenth embodiment.

FIG. 13 shows a block diagram of a HDTV video processing device according to the thirteenth embodiment. The video processing device according to the thirteenth embodiment substantially corresponds to the video processing device according to the twelfth embodiment. The only difference is that the second HV scaler HVS2 can receive at its input the output of the de-interlacer and a buffered frame or field. This provides for a greater flexibility of the secondary scaler HVS2. If a monitor output is not required the second HV scaler HVS2 may be decoupled and the process may be fully memory based.

By buffering the output of the secondary scaler HVS2, the monitor output can be decoupled. Accordingly, for example for a MPEG video flow, frame dropping can be implemented. By decoupling the output of the secondary scaler HVS2, different frame rates can be achieved between the main video flow, which masters the pixel rate through the secondary scaler, and the monitor output.

Taking the output of the de-interlacer as input for the secondary HV scaler HVS2 is advantageous, as the output of the de-interlacer has already undergone a noise reduction as well as the de-interlacing. Accordingly, a downsized replica of the main video flow can be achieved at the monitor output.

Figure 14:
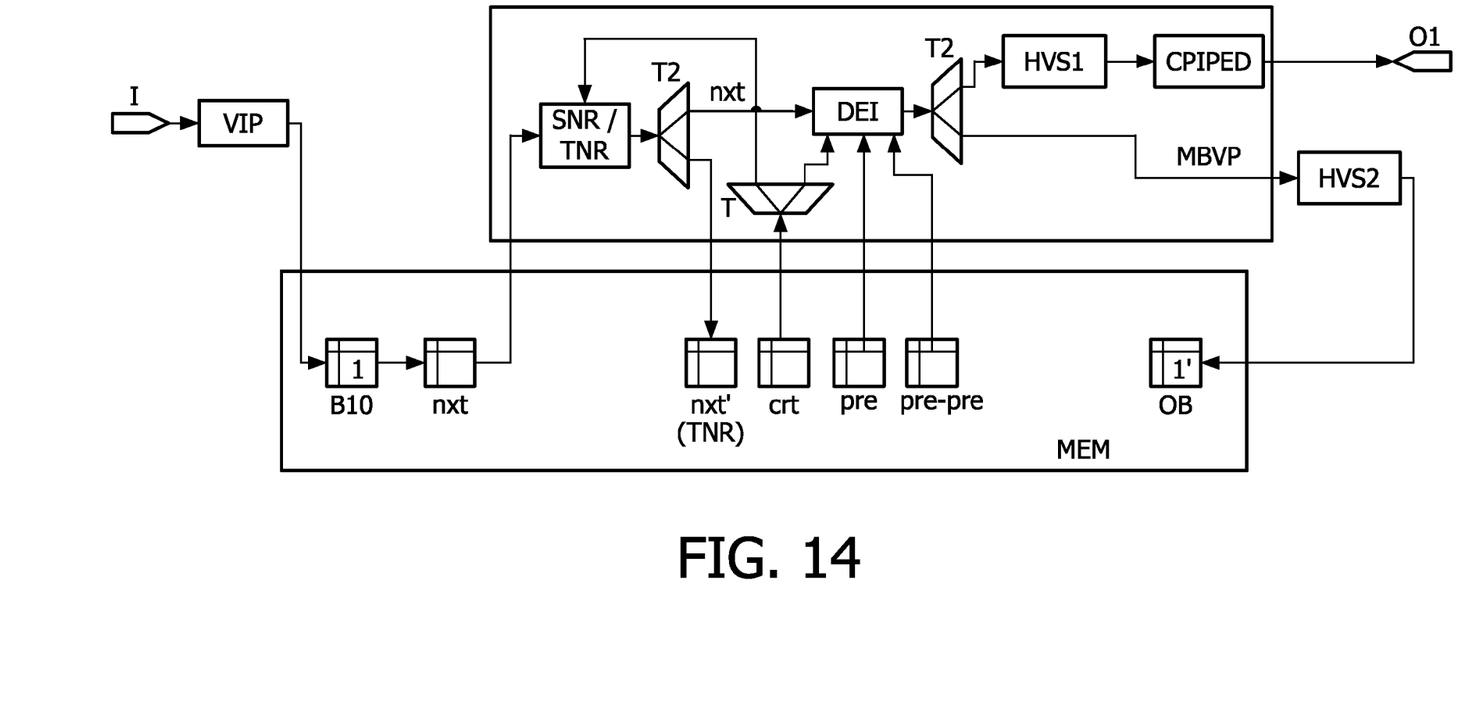
FIG. 14 shows a block diagram of a video processing device according to the fourteenth embodiment.

FIG. 14 shows a block diagram of a video processing device according to the fourteenth embodiment for an odd frame. The video processing according to the fourteenth embodiment is based on a dynamic frame insertion DFI technique, i.e. the recognition that flicker occurs at larger areas while blur occurs on image details. Therefore, a short hold time is used for image details while a long hold time is used for undetailed image parts. This may be performed by splitting the image into high and low spatial frequencies HP, LP, while a frame repeat is performed for the low spatial frequencies only. The amplified high spatial frequencies are shown in only one of the frames. DFI is preferably applied such that the perceived sharpness of its output on a static (non-motion) input image is equal to that of a frame repeat without the frequency split. More details on frame insertion is described in "P-44:Smooth frame insertion method for motion-blur reduction in LCDs", by Han-Feng Chen et al., Euro display 2005, page 359, which is herein incorporated by reference.

The video processing device according to the fourteenth embodiment comprises a video capturing unit VIP for capturing the input video I and an input buffer B10 for buffering the captured video data in the memory (preferably a unified memory) MEM. The video processing device furthermore comprises a memory based video processing unit MBVP. This unit includes a spatial noise reduction unit SNR, a temporal noise reduction unit TNR, a de-interlacing unit DEI, and a first HV-scaler HVS1. Accordingly, the main components of the memory based video processing according to the fourteenth embodiment substantially correspond to the components according to the previous embodiments. The output of the first HV scaler HSV1 is input to a composition pipe display output CPIPE. The output thereof is forwarded to the display out terminal O1.

The output of the de-interlacing unit DEI is coupled to a tap-off unit T2. The first output of the tap-off unit T2 is coupled to the first HV-scaler HVS1, while the second output of the tap-off unit is coupled to the second HV-scaler HVS2 for downscaling the output of the de-interlacer DEI. The downscaled video data is buffered in the unified memory. The downscaling of the video flow may be for example H/8×V/8. However, it should be noted that also other downscaling is possible. The output of the HV-scaler HVS2 is buffered in the output buffer OB of the unified memory MEM.

Figure 15:
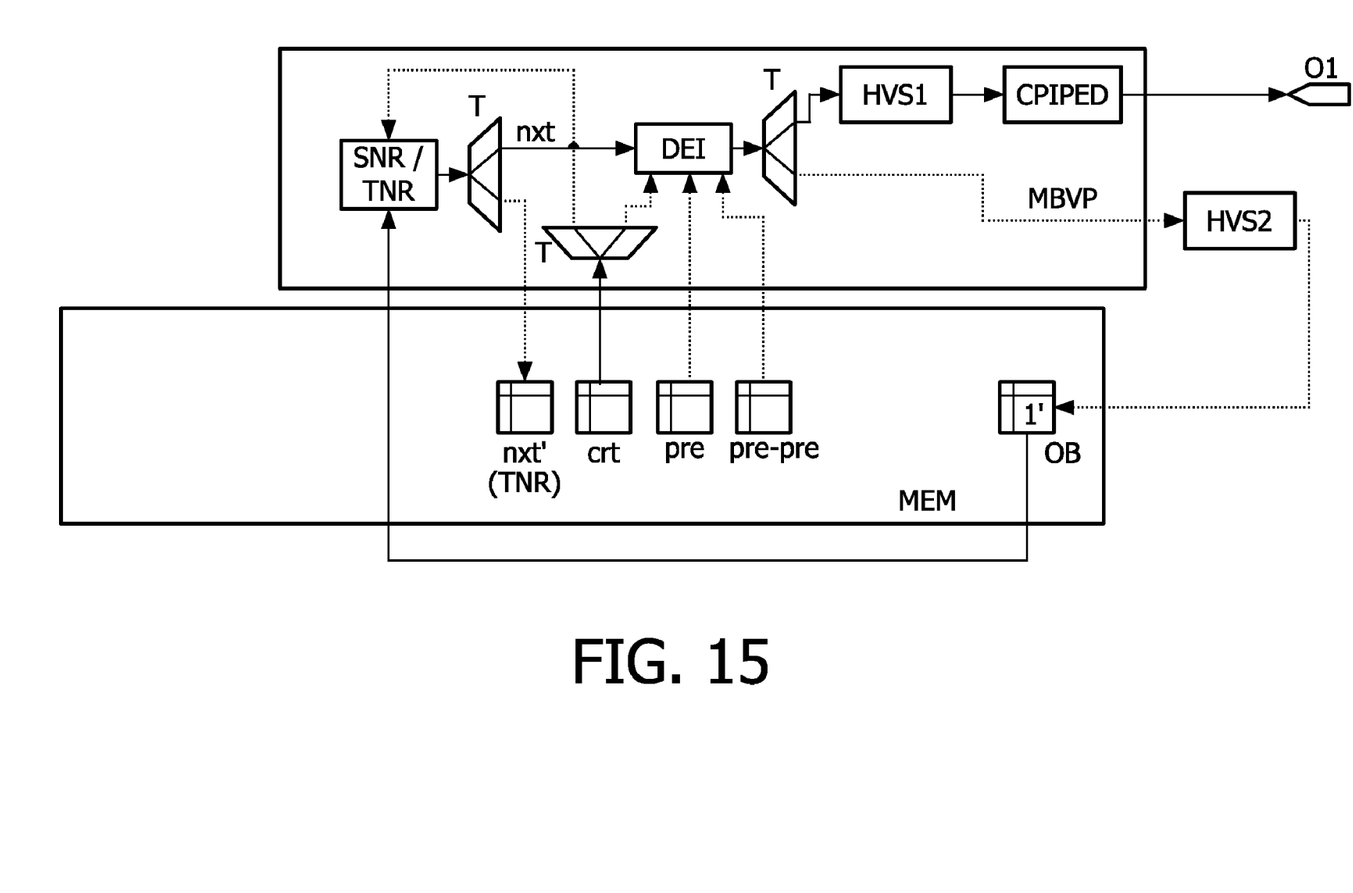
FIG. 15 shows a block diagram of a video processing device according to the fourteenth embodiment.

FIG. 15 shows a block diagram of a video processing device according to the fourteenth embodiment for an even frame. Here, only those parts of the video processing device are depicted which are required for the processing of the next frame. Those connections which are not required are depicted with dotted lines. Accordingly, for the next frame, i.e. for an even frame ($2N^{th}$ frame), the downscaled video data buffered in the output buffer OB is not output to a secondary output but is read and forwarded to the HV-scaler HVS1 by bypassing the spatial noise reduction unit SNR, the temporal noise reduction unit TNR, and the de-interlacer DEI. The reason for bypass is that all this functionality has been applied on the video when processing the odd frame $((2N-1)^{th}$ frame). HV up-scaling and spatial pixel and sub-pixel alignment is performed within the HV scaler HVS1. The up-scaling corresponds to the downscaling performed in the second HV scaler HVS2. The output of the even frames will therefore lack a certain amount of detail and look blurry in both horizontal and vertical direction and represent the lower spatial frequency part required for the dynamic frame insertion DFI.

Accordingly, every second frame substantially corresponds to a blurred replica of the first frame. The blurry replica is produced by the second HV downscaler. The odd frames will have the full detail and boosted high spatial frequencies, while the even frames will correspond to a blurry replica of the odd frames. By first downscaling a frame and then by up-scaling the frame, the frame is made blurry. The introduction of the blurriness in the even frames constitutes a trade-off as the video processing does not have the processing capabilities to interpolate a frame by for instance motion compensated techniques. By making the first frame sharp, i.e. with full details but by making the next frame blurry, motional artifacts like flicker can be avoided.

The implementation of the dynamic frame insertion may be provided without a secondary output. Here, the secondary scaler is used to enable the dynamic frame insertion by downscaling the output of the de-interlacer such that the downscaled video data may be upscaled again in order to provide a blurry frame.

Alternatively, the secondary output, i.e. the monitor output, may be coupled to the buffered output of the second HV downscaler. Alternatively, a further scaler may be introduced at the output of the de-interlacer DEI as described according to the first embodiment.

If the odd and even frames are taken together, on average these should be equal to the input video signal. In the first frame, the high frequencies are boosted. If the first and second frame are taken together, the amplitude response has been equalized.

The above described principles of the invention may be implemented in a scaler integrated circuit IC, in a TV IC or the like.

The invention also relates to the idea to provide a scaled (downscaled) replica of the main video flow, such that for example a SDTV signal is achieved from a HDTV signal. The present invention can be used to reduce the required bandwidth for the processing of the secondary video flow. This is performed by tapping-off the main video flow in order to provide a secondary video flow.

The tapping-off from the main video flow may also be performed after a pixel fetching unit. Accordingly, the tapping-off from the main video flow may be performed anywhere in the system between the noise reduction units SNR, TNR and the secondary output O2, i.e. behind the noise reduction unit SNR, behind the noise reduction unit TNR, behind the de-interlacer DEI. This is in particular advantageous as no additional access to the memory is required.

The invention also relates to the provision of a very high quality downsized version of the main video flow. In particular, if the tapping-off is performed after the de-interlacer, a high quality downscaled replica of the main video flow can be obtained. The output of the secondary video flow is used as a secondary monitor out which may be used for a VCR or a DVD recorder or for a further monitor which is not capable of displaying HDTV.

The spatial noise reduction in the embodiments regarding the MPEG decoding is advantageous for reducing effects and artifacts as introduced by MPEG coding and decoding.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. The word "comprising" does not exclude the presence of elements or steps other than those listed in a claim. The word "a" or "an" preceding an element does not exclude the presence of a plurality of such elements. In the device claim enumerating several means, several of these means can be embodied by one and the same item of hardware. The mere fact that certain measures are recited in mutually different dependent claims does not indicate that a combination of these measures cannot be used to advantage.

Furthermore, any reference signs in the claims shall not be construed as limiting the scope of the claims.

The invention claimed is:

1. Video processing device for processing a main video data flow and a secondary video data flow, wherein the secondary video data flow constitutes a scaled version of the main video data flow, comprising:

a tap-off unit having an input to receive the main video data flow from the video capturing unit for providing at least a first and second output, wherein each of the outputs correspond to the input;

a first H- and V-scaling unit (HVS1) coupled to the first output of the tap-off unit (T, T2) for performing a first H- and V-scaling on the main video flow;

a second H- and V-scaling unit coupled to the second output of the tap-off unit for performing a second H- and V-scaling on a secondary video flow to provide a scaled secondary video flow, the secondary video flow constituting a scaled version of the main video data flow;

a memory, wherein the output of the second H- and V-scaling unit is buffered in the memory before being output to an output of the secondary video flow;

a spatial noise reduction unit for performing a spatial noise reduction;

a temporal noise reduction unit for performing a temporal noise reduction, and a de-interlacing unit for de-interlacing the main video flow; and wherein the tap-off unit is coupled to the output of the de-interlacing unit (DEI).

2. Video processing device according to claim 1, wherein the second H- and V-scaling unit performs a downscaling of every odd or even frame and the output of the second H- and V-scaling unit is buffered in an output buffer, wherein for every even or odd frame the downscaled video data buffered in the output buffer is forwarded to the first H- and V-scaling unit for performing an up-scaling corresponding to the downscaling performed by the second H- and V-scaling unit.

3. Method for processing video data by processing a main video flow and a secondary video flow, wherein the secondary video flow constitutes a scaled version of the main video flow, comprising:

tapping-off the main video flow with a tap-off unit to provide a first and second tapped-off output, performing a first H- and V-scaling of the first tapped-off output to provide H- and V-scaling of the main video flow with a first H- and V-scaling unit, and performing a second H- and V-scaling of the second tapped-off output to provide a H- and V-scaling of the secondary video flow with a second H- and V-scaling unit;

buffering the output of the second H- and V-scaling in a memory;

performing a spatial noise reduction;

performing a temporal noise reduction, de-interlacing the main video flow with a de-interlacing unit; and wherein the tap-off unit is coupled to the output of the de-interlacing unit (DEI).

4. The method of claim 3, further comprising:

performing a downscaling of every odd or even frame and the output of the second H- and V-scaling buffered in an output buffer, wherein for every even or odd frame the downscaled video data buffered in the output buffer is forwarded to the first H- and V-scaling unit for performing an up-scaling corresponding to the downscaling performed by the second H- and V-scaling unit.

5. A system, comprising:

a video processor, the video processor including:

a video capturing unit configured to capture a main video data flow;

a tap-off unit having an input to receive the main video data flow from the video capturing unit for providing at least a first and second output, wherein each of the outputs correspond to the input;

a first H- and V-scaling unit (HVS1) coupled to the first output of the tap-off unit (T, T2) for performing a first H- and V-scaling on the main video flow;

a second H- and V-scaling unit coupled to the second output of the tap-off unit for performing a second H- and V-scaling on a secondary video flow to provide a scaled secondary video flow, the secondary video flow constituting a scaled version of the main video data flow;

a memory, wherein the output of the second H- and V-scaling unit is buffered in the memory before being output to an output of the secondary video flow;

a spatial noise reduction unit for performing a spatial noise reduction;

a temporal noise reduction unit for performing a temporal noise reduction, and a de-interlacing unit for de-interlacing the main video flow; and wherein the tap-off unit is coupled to the output of the de-interlacing unit (DEI).

6. The system of claim 5, wherein the second H- and V-scaling unit performs a downscaling of every odd or even frame and the output of the second H- and V-scaling unit is buffered in an output buffer, wherein for every even or odd frame the downscaled video data buffered in the output buffer is forwarded to the first H- and V-scaling unit for performing an up-scaling corresponding to the downscaling performed by the second H- and V-scaling unit.

* * * * *